United States Patent [19]
Mehta et al.

[11] Patent Number: 5,962,123
[45] Date of Patent: Oct. 5, 1999

[54] DECORATIVE LAMINATING SHEETS EMPLOYING PAPER CHIPS AND DECORATIVE LAMINATES MADE THEREFROM

[75] Inventors: Mahendra Mehta, Pittsfield; Richard D. Brownhill, Lee; John H. Bantjes, Dalton; William M. Stanard, Sheffield, all of Mass.

[73] Assignee: The Mead Corporation, Dayton, Ohio

[21] Appl. No.: 08/659,444

[22] Filed: Jun. 6, 1996

[51] Int. Cl.⁶ .............. B32B 5/02; B32B 5/22; B32B 5/26; B32B 5/28

[52] U.S. Cl. ............ 428/326; 428/340; 428/207; 428/211; 428/402; 428/533; 428/534; 428/535; 428/537.5; 442/417; 162/162; 162/185

[58] Field of Search .................. 162/162, 185; 428/15, 195, 261, 203, 204, 206, 207, 211, 326, 340, 402, 533, 534, 535, 537.5; 442/153, 160, 161, 162, 163, 164, 417

[56] References Cited

U.S. PATENT DOCUMENTS

| | | |
|---|---|---|
| 3,625,810 | 12/1971 | Swartz ................................ 161/119 |
| 4,044,185 | 8/1977 | McCaskey, Jr. et al. ............... 428/153 |
| 4,126,727 | 11/1978 | Kaminski ................................ 428/172 |
| 4,259,386 | 3/1981 | Wagstaffe ............................... 428/159 |
| 4,374,886 | 2/1983 | Raghava ................................. 428/172 |
| 4,376,812 | 3/1983 | West ....................................... 428/165 |
| 4,605,584 | 8/1986 | Herr, Jr. et al. ....................... 428/142 |
| 4,699,820 | 10/1987 | Herr, Jr. et al. ....................... 428/142 |
| 4,988,591 | 1/1991 | Winkelmann ............................ 430/43 |
| 5,034,084 | 7/1991 | Schäfer et al. ......................... 156/278 |
| 5,240,810 | 8/1993 | Barjestah ................................ 430/257 |
| 5,252,378 | 10/1993 | Mehta et al. ........................... 428/195 |
| 5,330,595 | 7/1994 | Held ........................................ 156/64 |
| 5,338,584 | 8/1994 | Kubota et al. ............................ 428/15 |
| 5,500,259 | 3/1996 | Kubota et al. ............................ 428/15 |
| 5,545,467 | 8/1996 | Suzuki et al. .......................... 428/211 |

FOREIGN PATENT DOCUMENTS 1-040697  2/1989  Japan .

*Primary Examiner*—Vivian Chen
*Attorney, Agent, or Firm*—Thompson Hine & Flory LLP

[57] ABSTRACT

A decorative laminate comprising a decorative paper sheet and a plurality of resin impregnated sheets wherein color is incorporated into said decorative paper sheet as non-resin impregnated paper chips or one or more colors.

13 Claims, 1 Drawing Sheet

DECORATIVE LAMINATING SHEETS EMPLOYING PAPER CHIPS AND DECORATIVE LAMINATES MADE THEREFROM

BACKGROUND OF THE INVENTION

The present invention relates to decorative laminating papers and to decorative laminates incorporating those papers. More particularly, the invention relates to decorative laminating papers in which the decor sheet or the overlay sheet contains paper chips of one or more colors, to impart a randomly distributed colored pattern to the sheet.

High-pressure decorative laminates are laminated articles comprising plural layers of synthetic resin impregnated paper sheets consolidated or bonded together into a unitary structure under high heat and pressure. Conventionally, the decorative or print layer is a sheet of high quality cellulose fiber and fillers. The decorative sheet may be overlaid with a low basis weight transparent sheet, known as an overlay. These sheets are impregnated with a thermosetting resin such as melamine formaldehyde, assembled with a plurality of core or body sheets of a fibrous cellulosic material, usually unbleached kraft paper, impregnated with a thermosetting resin such as phenolformaldehyde resin, and cured. Typically, up to seven or eight core sheets are consolidated with a decor sheet and an overlay sheet to form a decorative laminate. However, in the low pressure process, a single decor sheet is directly laminated onto a core sheet, typically chip board.

Decorative laminates are widely employed in the building industry for use as counter tops, kitchen and bathroom work surfaces, wall paneling, flooring, cabinetry, partitions and doors. Because they are generally more durable than wood and provide an attractive appearance, decorative laminates are also popular in the furniture industry, primarily as tops for furniture such as tables and desks. Their low cost, impact and abrasion resistance, durability, clarity, and their resistance to heat, ultraviolet light and mild chemicals make decorative laminates very useful.

In the preparation of solid color decorative papers, the colorant or pigment is typically added to the pulp prior when forming the sheet on the papermaking machine. This method generally has been limited to producing decorative papers which have a uniformly solid color. Until recently, if a decorative design, pattern or a kaleidoscope effect were desired in a decorative sheet, a separate printing process with a printing cylinder or plate specifically made for each color and intensity was required. U.S. Pat. No. 5,252,378 discloses a method of producing decorative sheets having localized patterns of color, wherein the color is incorporated into the fibers of the decorative sheets as various wax-encapsulated pigments or beads, containing numerous individual pigment particles of one or more colors.

The incorporation of plastic chips, foil chips, pigmented resin particles, metallic flakes, etc., into decorating materials such as plastic decorative surfaces, vinyl floorings, etc., is known in the art. U.S. Pat. No. 4,699,820 and U.S. Pat. No. 4,605,584 disclose decorative materials comprising crinkled chips of platelet materials or metallic flakes. U.S. Pat. No. 4,126,727 discloses a flooring structure in which pearlescent chips or flakes are placed over an alternating light and dark background pattern.

It would be desirable to have a decorative laminating paper for use in decorative laminates which is economical to manufacture and in which multicolored patterns are created within the sheet in a one-step process without printing the decor, i.e., interspersed among the fibers to improve its appearance of localized single or multicolored patterns characteristics. The present invention provides such a decorative sheet, a method for preparing such decorative sheet, and a decorative laminate using such decorative sheet.

SUMMARY OF THE INVENTION

The present invention relates to a decorative sheet having localized areas of color therein provided by a plurality of paper chips. The sheet may be a decor sheet or an overlay sheet. Depending on the color, size, shape and distribution of the chip, a variety of decorative effects can be provided. In particular, a simulated marble or granite effect, or other stone-like effects or other decorative effects are available.

The decorative laminating sheet of this invention contains randomly or uniformly shaped paper chips interspersed among the fibers. The paper chips may be cut or chopped from colored decorative laminating papers. One or more colors may be used depending on the effect desired. In those cases where multi-colored patterns are desired in the decorative sheet, paper chips of various colors may be employed. In those cases where random patterns are desired in the decorative sheet, paper chips with various shapes and sizes may be employed. The paper chips may be cut or chopped from decorative laminating papers either with or without laminating resin pretreatment. Resin impregnated paper chips provide sharper more well defined designs. Whereas, unimpregnated paper chips result in designs with softer edges.

The paper chips are added directly to the papermaking furnish for the decorative sheet. This is an important aspect of the present invention because the chips become interspersed among the fibers of the decorative paper to provide single or multicolored patterns. The two dimensional nature of the paper chips causes the chips to align within the plane of the decor or overlay sheet, during the papermaking process. Preferably, the chips extend substantially through the decorative sheet (i.e., from the top of the decorative sheet to the bottom of the decorative sheet). However, in some cases, the chips may extend only partially through the decorative sheet. Alignment within the plane of the decor or overlay sheet, minimizes any effect the paper chips may have on laminate thickness or surface texture. In addition, since the paper chips are distributed throughout the decorative sheet and not simply on the surface of the sheet, the colored patterns will tend not to abrade away during use, nor will they tend to flake off during use as long as the sheet is present and intact.

The distribution of the paper chips in the Z-direction makes it possible to achieve 3-dimensional effects in the decorative laminates in which the decor or overlay papers of the present invention are incorporated. Incorporating the paper chips into a overlay sheet allows multiple design variations by varying the color of the decor sheet used under the overlay in the decorative laminate. This approach helps reduce the inventory of printed patterns and allows flexibility during production.

The decorative laminating sheet of this invention may be employed as a single sheet for a decorative laminate or the decorative sheet may be laminated with one or more sheets or may be laminated with other decorative laminating sheets to provide a multi-layered decorative sheet for the laminate. The laminating resin can freely penetrate the paper chips included in the decorative sheet and bond with the laminating resin in pretreated chips to form well bonded random designs in the final decorative laminate.

DETAILED DESCRIPTION

Figure 1:
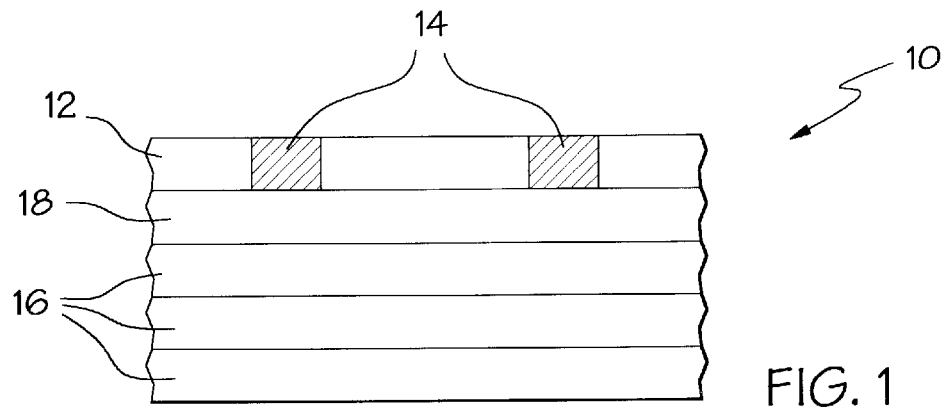
FIG. 1 is a diagrammatic, greatly enlarged elevation section through a decorative multi-layer laminate of this invention.

With the exception of the addition of the paper chips, a conventional furnish can be used to form decorative laminating papers in accordance with the present invention. A typical furnish includes fibers, water, paper chips, and conventional additives. The furnish preferably has a consistency of about 0.5 to 3%. The amount of paper chips added to the dispersed fibers can be up to about 100% by weight and, preferably, about 10 to 40% based on the weight of fiber. However, the exact amount of paper chips will depend in part on the nature of the fiber and the decorative effect desired. The size of the paper chips is preferably in the range of about 0.1 to 10 mm long and 0.1 to 5 mm wide to provide the desired color and color separation. Screening of the paper chips can be used to separate them into various size ranges if a more uniform effect is desired. Paper chips of the same size would tend to produce a more uniform appearance of the decorative sheet. A particular advantage of the present invention, when more than a single color of paper chips is used, is that randomly distributed and distinctive localized patterns are obtained.

Additives which may be employed in the furnish include fillers such as titanium dioxide, clay, talc, silica, alumina, etc. in amounts up to about 80% based on the amount of fiber. Overlays may additionally contain an abrasion resistant grit in an amount of 0.5 to 20 wt. %.

The decor papers of the present invention can be made by the following procedure. The furnish containing paper chips is deposited on a continuous screen of a paper machine where the water is removed as part of the standard papermaking process by a combination of filtration on the screen, pressing the web against an absorbent felt material, and contacting the web with a heated roller, and/or by passing the web through heated air, microwaves or infrared radiation. The basis weight of the decorative paper of this invention is used at about 10 to 150 pounds/3000 sq. ft. and preferably about 10 to 50 pounds/3000 sq. ft. for an overlay and 40 to 120 pounds/3000 sq. ft. for a decor sheet.

The paper chips employed in the present invention can be cut or chopped from any paper, but a particularly convenient source is sheets of decor papers which can vary in color. The decorative laminating papers can be, but are not necessarily, impregnated with a laminating resin. The paper chips can be cut or chopped into random or uniform shapes and sizes depending upon the desired effect. Paper chips of similar shape, size and color produce a more uniform appearance in the resulting decorative sheet within which they are incorporated. Any shaped chip can be used including triangular (preferably acute), rectangular (including square), circular, elliptical, star-shaped, etc. In a particular embodiment, the chips are in the shape of small triangular shards.

The use of clear overlay as the basesheet for the paper chip inclusion allows multiple design variations by varying the color of the decor or printbase sheet used under the overlay in the decorative laminate.

The distribution of the paper chips in the Z-direction makes it possible to achieve 3-dimensional effects in the decorative laminates in which the decor or clear overlay papers of the present invention are incorporated. The distribution of paper chips in the sheet is typically random, but it is not outside the invention to use a controlled distribution of the chips where more chips are used in certain portions of the sheet than other portions.

The laminating resins employed in making the laminates are those commonly used in the industry and include melamine-formaldehyde, urea-formaldehyde, polyester, epoxy, etc. The preferred resin for laminating decorative sheets is melamine-formaldehyde. The laminating resin can freely penetrate the paper chips included in the decorative sheet and bond with the laminating resin in pre-treated chips to form well bonded random or uniform designs in the final decorative laminate.

The fibrous materials used in this invention to provide the decorative web are those successfully employed in the preparation of decorative papers. For example, fibrous materials such as cellulose, rayon, polyester, acrylic, nylon, glass, ceramic or any other natural or man-made fiber or combinations thereof. Preferably, the fiber is a cellulosic fiber obtained from a mixture of bleached hardwood kraft pulp, bleached softwood kraft pulp or cotton linter pulp.

Figure 2:
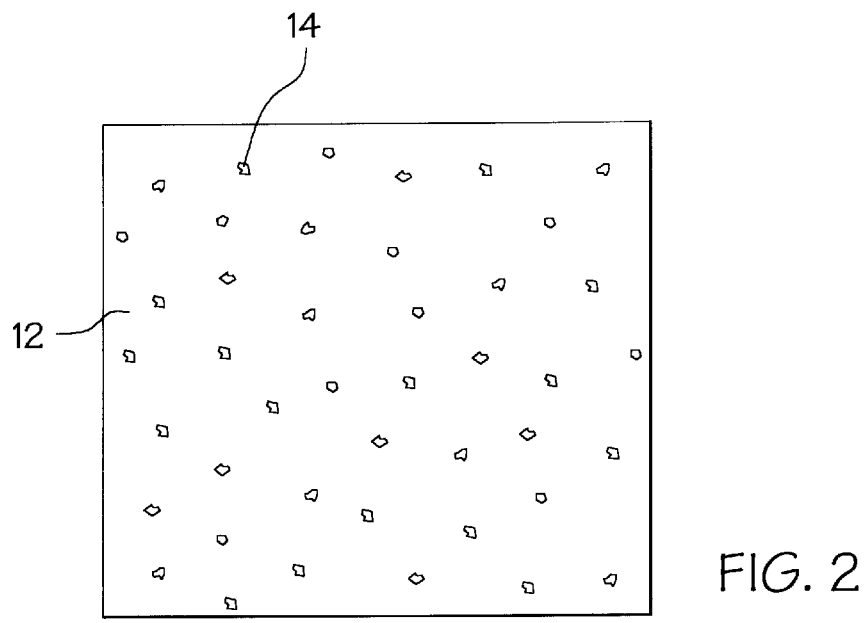
FIG. 2 is a top view of a decorative paper sheet showing the decorative features of a decorative paper sheet in accordance with the invention.
Figure 3:
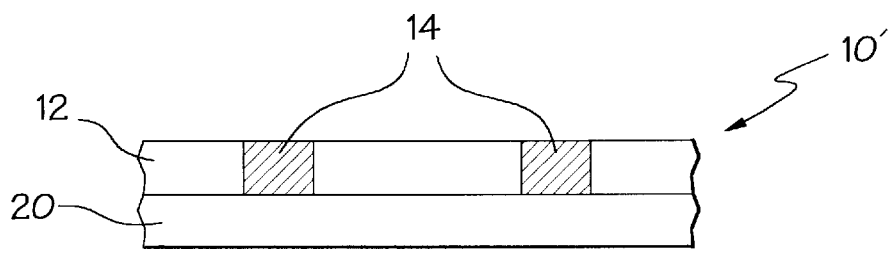
FIG. 3 is a diagrammatic, greatly enlarged elevation section through an alternate embodiment of a decorative laminate of this invention.

As shown in FIGS. 1–3, the decorative paper of this invention may be used to make decorative laminates, generally designated 10. As shown in FIG. 1, the decorative paper sheet 12, preferably a decor sheet or an overlay sheet, having paper chips 14, which extend substantially through the decorative paper sheet 12, and interspersed through it may be laminated with one or more sheets, generally designated 16, for example core sheets, or may be laminated with other decorative sheets, generally designated 18, for example white decor sheets, multicolored decorative sheets or the like, to provide a multi-layered decorative sheet for the laminate 10. As shown in FIG. 3, the decorative paper having paper chips 14, which extend substantially through the decorative paper sheet 12, and interspersed through it of this invention may be employed as a single top decorative paper sheet 12 for a decorative laminate 10, such as in a low pressure process where the decorative paper sheet 12 is directly laminated onto a chip board 20 or the like. The decor sheets may be employed in a continuous pressure laminating process.

The following examples are given to illustrate the present invention more specifically. It will be understood, however, that applicants are not limited to the specific procedure and products shown in these specific examples.

EXAMPLE 1

Three different decorative paper samples were cut into irregular shaped chips (pieces) as follows: brown organic filled paper (A), brown unfilled overlay (B), and gray resin pre-treated decor (C).

Three different decorative sheets were prepared (Samples 1, 2, 3). Sample 1 was prepared by adding 6% of A and 1% B based on pulp weight to an overlay handsheet furnish at 30 lb. basis weight. Sample 2 was prepared by adding 2.2% B to a clear overlay handsheet at 30 lb. basis weight and put into a blender for 1 minute. Sample 3 was prepared by adding 20% C to a clear overlay handsheet at 30 lb. basis weight. The overlay handsheet was composed of 95% bleached hardwood kraft and 5% bleached hardwood sulphite.

Decorative laminates were prepared using each overlay sheet. Laminates prepared using the overlays over white and black decor sheets showed pleasing decorative effects with a 3-dimensional look, random distribution of paper chips and no debonding of paper chips or surface defects.

EXAMPLE 2

Blue and black resin pre-treated decor papers were chopped into random sized and shaped chips in a household chopper. These chips were then added to standard overlay furnish containing 2% titanium dioxide and the mixture was formed into 30 lb. basis weight handsheets. The overlay handsheet was composed of 95% bleached hardwood kraft and 5% bleached hardwood sulphite Chip addition rates were as follows (percent by weight based on 100% pulp solids): 1) 10% chips, 2) 20% color chips, 3) 30% color chips.

Decorative laminates were then prepared using the overlay sheets. Laminates over a gray decor sheet showed pleasing 3-dimensional random distribution decorative effects with no debonding of paper chips or surface defects.

Having described the invention in detail and by reference to preferred embodiments thereof, it will be apparent that modifications and variations are possible without departing from the scope of the invention defined in the appended claims.

What is claimed is:

1. A decorative laminate comprising a plurality of fibrous sheets wherein at least one of the top sheets is a decorative paper sheet of fibrous material having distributed therethrough a plurality of non-resin impregnated paper chips, said sheets being impregnated with a laminating resin and cured.

2. The laminate of claim 1 wherein the fibrous material is selected from the group consisting of cellulose, rayon, polyester, acrylic, nylon, glass, ceramic, and combinations thereof.

3. The laminate of claim 2 wherein the fibrous material is bleached cellulosic fibers.

4. The laminate of claim 1 wherein the paper chips are randomly shaped.

5. The laminate of claim 1 wherein the paper chips are randomly sized.

6. The laminate of claim 1 wherein the paper chips are aligned within the plane of the sheet.

7. The laminate of claim 1 wherein said paper chips are randomly distributed in said sheet.

8. The laminate of claim 1 wherein said sheet containing said paper chips is an overlay having a basis weight of about 10 to 50 pounds per 3000 sq. ft.

9. The laminate of claim 1 wherein said sheet containing said paper chips is a decor sheet having a basis weight of about 40 to 120 pounds per 3000 sq. ft.

10. The laminate of claim 1 wherein at least one of said plurality of fibrous sheets is an overlay having a basis weight of about 10 to 50 pounds per 3000 sq. ft. and at least one of said plurality of fibrous sheets is a decor sheet having a basis weight of about 40 to 120 pounds per 3000 sq. ft.

11. The laminate of claim 1 wherein said fibrous sheets are overlays having a basis weight of about 10 to 50 pounds per 3000 sq. ft.

12. The laminate of claim 1 wherein said fibrous sheets are decor sheets having a basis weight of about 40 to 120 pounds per 3000 sq. ft.

13. The sheet of claim 1 wherein the paper chips are from 0.1 to 10 mm in length and from 0.1 to 5 mm in width.

* * * * *